Figure 1:
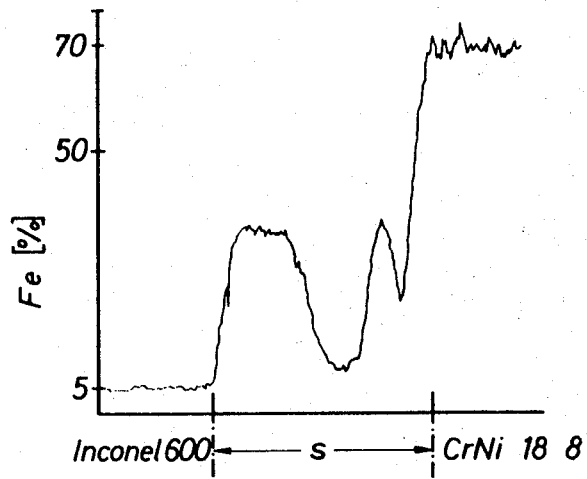

United States Patent

[11] 3,560,700

[72] Inventors Werner Andreas Reidelsturz
 Staffort;
 Dieter Rodrian, Karlsruhe; Willy Franz
 Edmund Scheibe, Leopoldshafen, Germany
[21] Appl. No. 745,576
[22] Filed July 17, 1968
[45] Patented Feb. 2, 1971
[73] Assignee Gesellschaft Fur Kernforschung MBH
 Weberstrasse, Germany
 a corporation of Germany
[32] Priority July 18, 1967
[33] Germany
[31] P 16 15 280.0

[54] ELECTRON BEAM WELDING OF TWO
 DISSIMILAR METALS
 2 Claims, 9 Drawing Figs.
[52] U.S. Cl. .................................................. 219/121
[51] Int. Cl. ......................................................... B23k 15/00
[50] Field of Search ............................................ 219/121,
 121EB, 137, 69

[56] References Cited
UNITED STATES PATENTS
2,968,715  1/1961  Wyman et al. ................. 219/121
2,987,610  6/1961  Steigerwald ................... 219/121
2,989,614  6/1961  Steigerwald ................... 219/121
3,161,950 12/1964  Cobb ............................ 219/121
3,420,978  1/1969  Webb ............................ 219/121

Primary Examiner—J. V. Truhe
Assistant Examiner—R. E. O'Neill
Attorney—Burgess, Dinklage and Sprung ABSTRACT: In the welding of two metals which are substantially dissimilar with respect to at least one pure metal component such that in normal practice a zone of embrittlement occurs in the weld, a ductile weld is obtained by means of an electron beam applied along a line closely adjacent but spaced from the center line of the weld with the energy input of the electron beam being controlled so that the concentration of the pure metal component in the finished weld remains substantially constant across the width of the weld except for a very fine zone of transition at the edge of the weld wherein it changes to equal the concentration of that component in one of the two metals.

V 10 Ti     S     Cr Ni 18 8

V 10 Ti     S

ELECTRON BEAM WELDING OF TWO DISSIMILAR METALS

The invention relates to a welding procedure for the reduction or elimination of brittle intermetallic phase(s) which are normally produced in the welding seam between metallic materials and which adversely affect the stability of the welding joint.

These materials include, e.g., the metals titanium, zirconium, niobium, vanadium used in nuclear technology, aviation and spacecraft industry and also special cases in conventional technology, as well as their alloys, e.g., zircaloy, V10 Ti, which have to be welded to conventional materials, such as high temperature and corrosion steels, aluminum, copper etc.

Due to their excellent corrosion resistance against boiling water in pressure-tube reactors and on account of their small neutron absorption zirconium and its alloys are employed in reactor engineering as canning materials for fuel rods. The same applies to titanium, vanadium and their alloys which are preferably used structural materials in reactor technology because of their favorable corrosion properties and their high strength.

The welding of two alloys which are only little different from each other—e.g. the welding of different steels—is already a complicated business and only possible by the use of appropriate filling materials and by thermal treatment procedures. Much less transparent and, hence, much more complicated are the problems encountered when welding very dissimilar materials, e.g. steels to titanium, zirconium, niobium, vanadium or their alloys, since even in the case of simple systems, e.g., binary systems, and assuming the state diagrams of these multicomponent systems as known, the formation of mixed crystals in the melting zone cannot be deducted from the state diagrams due to the very dissimilar cooling conditions depending on the type of welding method employed.

Though the formation of mixed crystals can be influenced to a certain extent with the aid of conventional welding methods by using filling materials, this requires in almost every case an appropriate thermal treatment which is, however, disliked in reactor engineering for several reasons.

It is the task of the present invention to influence the mixing ratios existing in the welding zone in a way as to allow for a sound welding of even dissimilar materials susceptible to the formation of brittle intermetallic phases in the melting zone, without the use of filling materials and by observing the required purity levels as well as avoiding prior and subsequent thermal treatments, so that flawless, ductile welding joints capable of carrying heavy loads can be achieved.

It was studied by the use of several welding methods to what extent the concentration development in the welding seam and hence the stability behavior can be influenced.

The first testing materials used for obtaining reliable date data on the mixture ratios in the melted-on zone were two alloys which can be welded satisfactorily to each other, but which are very different with regard to at least one alloy component.

From this aspect the two alloys CrNi 18 8 (about 70 percent iron) and Inconel 600 (about 5 percent iron) are selected. These materials are butt-welded to each other as 0.5 mm. thick sheets, using the WIG-method as well as the electron beam method of welding. The concentration development of iron and nickel in the melting zone is determined by a microprobe. The weldings according to the WIG-method in the absence of filling materials led, in general, to the observation that even by varying the welding parameters "current" and "welding speed" a well-defined concentration development could not be achieved. As is seen from FIG. 1, the iron concentration measured over the whole width of the welding seam, varies very arbitrarily between the lowest iron content in case of Inconel 600 and the highest iron content in the case of CrNi 18 8; approximately in the center of the melting zone it returns to the original value of 5 percent, while it visibly decline after another rise before it approaches the concentration of 70 percent on the side of CrNi 18 8 steel. At slower welding speeds of less than 2 mm/s. with the current kept constant a plateau with smaller variations is reached at approximately 35 percent iron content. It was not possible to vary the level of the plateau in a reproducible manner.

By the use of the electron beam method the possibility of influencing the mixing and cooling conditions seemed to increase because of the density of energy enhanced by the factor $10^{3-4}$, the focused application of energy and the large range of variations of the welding parameters, e.g., acceleration tension, beam current, welding speed, beam movement and duration of beam application (pulsed electron beam).

Taking the same testing materials CrNi 18 8 and Inconel 600 the attempt was made with the electron-beam welding method to influence the development of concentration. A pulsed electron beam was particularly suited to control in a unique way and with the possibility of reproduction the development of concentration as a function of the point of impingement of the electron beam.

Figure 2:
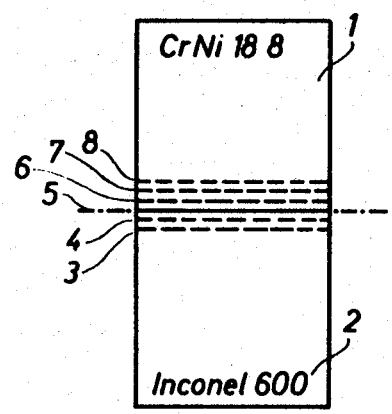

FIG. 2 shows the different points of impingement of the electron beam. The dash-dotted line 5 represents the joint of the two materials CrNi 18 8 1 and Inconel 600 2 to be welded to each other. In the test welding the electron beam was applied parallel to the joint 5 at a distance representing a multiple of 0.9 mm. and the concentration development was measured over the welding seam width. On the Inconel 600 side 2 the welding seam was displaced by 0. 0.18 mm. 3 and by 0.09 mm. 4 parallel to the joint. Subsequently, a welding was made with the point of impingement of the electron beam situated within the joint 5. On the side of the CrNi 18 8 steel 1 the points of impingement of the electron beam were displaced by 0.09 mm. 6, by 0.18 mm. 7 and by 0.27 mm. 8 parallel to the joint.

Figure 3:
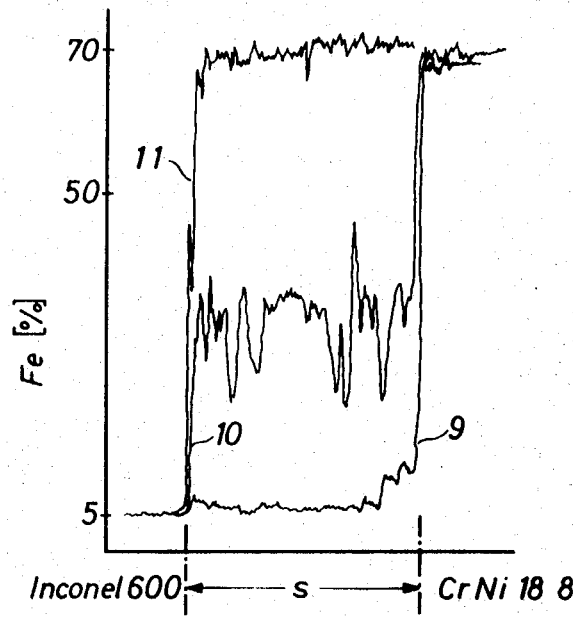

FIG. 3 shows the iron-concentration development 9 plotted against the welding-seam width in case of an electron-beam welding, as it is observed following the displacement of the point of impingement by 0.18 mm. 3 on the side of Inconel 600 2, as well as the iron-concentration development 10 observed following the displacement of the point of impingement into the joint 5 and the iron-concentration development 11 observed following the displacement of the point of impingement by 0.27 mm. 8 on the side of the CrNi 18 8 steel 1. The nickel-concentration development takes always a complementary course to that of the iron-concentration development, but has not been plotted on the FIG. for reasons of clearness. s means the width of the welding seam.

Figure 4:
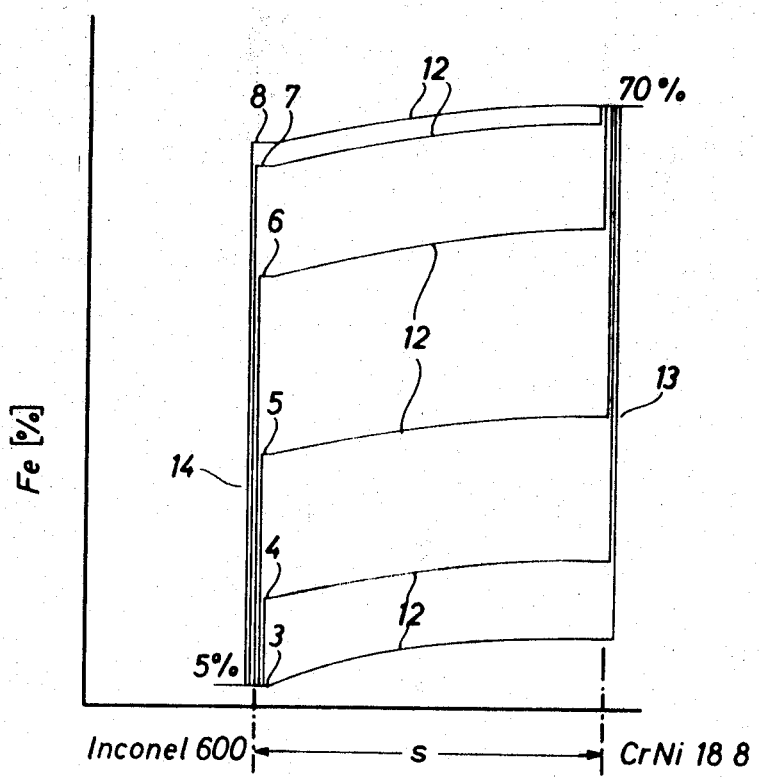

In FIG. 4 the Fe-concentration curves are represented in linear form over the welding-seam width s, i.e., without considering the variations in concentration and different welding seam widths, for the different distances 3—8 of the points of impingement from the joint 5 of the materials CrNi 18 8 steel 1 and Inconel 600 2 to be welded and represented in FIG. 2. The FIG. shows that practically any concentration development can be reproducibly achieved. Both the level of the individual plateaus 12 and the position and degree of concentration leaps 13, 14 can be varied. In order to achieve more clearness in the representation of the course of concentration curves, the concentration leaps 13 and 14 were laterally transposed. The variations in concentration depend primarily on the welding speed and the manner of beam conduction. By these preliminary studies with model materials which do not form intermetallic phases, but which allow for an excellent examination of the concentration development over the welding-seam width due to the homogeneous alloy components available in various concentrations, the theoretical fundamentals for welding dissimilar materials which are susceptible to form brittle intermetallic phases in the melt, could be found.

The invention solves the task set at the beginning of this description by preferably influencing with the aid of a charge carrier beam the concentration development of the material components over the welding-seam width s through the welding parameters—intensity, type, duration of effect and above all, point of application of the welding energy—so that a constant concentration of material components is obtained over the major part of the welding-seam width s, which lies considerably above or below the concentration of the intermetallic phase(s) and that the one of the intermetallic phase is traversed in an extremely narrow zone of welding-seam width Δs with the help of a concentration leap. The narrow zone Δs in which brittle intermetallic phases still occur, is less than 10 μs, as results from hardness measurements and structure examinations.

The method according to the invention uses a charge carrier beam, since it allows for a concentrated application of energy and an exact setting of all parameters, especially the point of impingement.

The method according to the invention offers particular advantages in case that an energy-dosed pulsed electron beam taking into account the thermal properties of the materials to be welded will be used according to the relation $$I \cdot \frac{L_P}{L_i} \cdot U \cdot v > 7 \cdot 10^2 \left( \frac{\text{Watt} \cdot \text{cm.}}{s} \right)$$

and in case that the point of impingement of this electron beam is chosen so as to be located outside the joint of the materials to be welded, preferrably in a region of 0.07 to 0.2 mm. distance from the joint, with I = beam current in Amp.
$L_p$ = length of period in milliseconds
$L_i$ = length of impulse in milliseconds
$\frac{L_p}{L_i}$ = ratio between period length and impulse length
U = acceleration tension in Volt
v = welding speed in cm/s However, in specific cases a continuous beam can be used instead of a pulsed electron beam, the ratio between period length and impulse length $L_p/L_i$ being 1.

The above relation is the decisive prerequisite for the concentration leap being exactly the same in each depth of materials, especially for material thicknesses up to 5 mm.

The method according to the invention can be used to weld any material combination in which brittle intermetallic phases occur. In these cases the bending angles only depend on the ductility of the mixed crystal.

Thus, the method according to the invention allowed, e.g., to weld titanium or its alloys to other construction materials, such as iron and steel, and above all austenitic steels or copper, etc.

Furthermore, the welding of zirconium or its alloys to other metals, such as iron and austenitic steels becomes possible with the aid of the method according to the invention.

Vanadium or its alloys could also be welded to austenitic steels or aluminum etc. by using the method according to the invention.

In the case of niobium or its alloys it was also possible with the method according to the invention to weld them to iron and nickel or their alloys.

The following table lists for some material combinations the bending angles obtained, which are a measure for the ductility of the welding joint, as a function of the welding parameters (acceleration tension, intensity of beam current, welding speed, period- and impulse length) and the lateral displacement of the electron beam from the joint:

| Material combination | Welding parameter | | | | | Point of impingement of the beam | Bending angle, degree |
|---|---|---|---|---|---|---|---|
| | U [kv.] | I [ma.] | v [mm./s.] | $L_p$ [ms.] | $L_i$ [ms.] | | |
| Sheet thickness 0,5 mm. | | | | | | | |
| Al-Cu | 105 | 2,0 | 40 | 1 | 0,4 | 0,1 in Al | 180 |
| Al-Fe | 105 | 2,0 | 40 | 1 | 0,4 | 0,1 in Fe | 180 |
| Al-Ni | 130 | 1,4 | 20 | 1 | 0,4 | 0,15 in Al | 180 |
| Al-Ti | 105 | 2,0 | 40 | 1 | 0,4 | Independent | 180 |
| Al-V | 105 | 2,0 | 40 | 1 | 0,4 | do | 180 |
| Al-Zr | 105 | 2,0 | 40 | 1 | 0,4 | do | 180 |
| Cu-Ti | 105 | 3,3 | 40 | 0,36 | 0,15 | 0,2 in Cu | 180 |
| Fe-Nb | 130 | 1,5 | 20 | 1 | 0,4 | 0,15 in Fe | 180 |
| Fe-Ta | 105 | 2,4 | 40 | 1 | 0,4 | 0,1 in Fe | 180 |
| Fe-Ti | 130 | 1,3 | 20 | 1 | 0,4 | 0,15 in Fe | 90 |
| Fe-Zr | 130 | 0,9 | 20 | 0,36 | 0,15 | 0,15 in Fe | 45 |
| V-Zr | 130 | 1,3 | 20 | 1 | 0,4 | 0,15 in V | 120 |
| CrNi 18 8-Al | 120 | 1,2 | 15 | | | 0,1 in CrNi 18 8 | 180 |
| CrNi 18 8-Nb | 130 | 1,7 | 20 | 1 | 0,4 | 0,1 in CrNi 18 8 | 110 |
| CrNi 18 8-Ta | 130 | 1,9 | 20 | 1 | 0,4 | 0,75 in CrNi 18 8 | 110 |
| CrNi 18 8-Ti | 130 | 1,3 | 20 | 1 | 0,4 | 0,15 in CrNi 18 8 | 40 |
| CrNi 18 8-Zr | 130 | 1,9 | 20 | 0,36 | 0,15 | 0,15 in CrNi 18 8 | 45 |
| CrNi 18 8-V | 105 | 2,4 | 40 | 1 | 0,4 | 0,1 in CrNi 18 8 | 180 |
| CrNi 18 8-VloTi | 105 | 2,4 | 40 | 1 | 0,4 | 0,15 in CrNi 18 | 180 |
| CrNi 18 8-Zirkaloy | 130 | 1,3 | 20 | 1 | 0,4 | 0,2 in CrNi 18 8 | 15 |
| Nb-Ni | 130 | 1,3 | 20 | 1 | 0,4 | 0,1 in Ni | 180 |
| Ni-Ta | 130 | 1,3 | 20 | 1 | 0,4 | 0,1 in Ni | 180 |
| Ni-Ti | 130 | 1,3 | 20 | 1 | 0,4 | 0,15 in Ni | 180 |
| Ni-V | 105 | 2,4 | 40 | 1 | 0,4 | 0,15 in Ni | 180 |
| Inconel 600-Nb | 130 | 1,7 | 20 | 1 | 0,4 | 0,12 in Inc. 600 | 180 |
| Sheet thickness, 2 mm. | | | | | | | |
| Ni-Al | 130 | 3,0 | 20 | 1 | 0,4 | 0,1 in Al | 180 |
| Zr-Al | 130 | 3,0 | 20 | 1,0 | 0,4 | 0,1 in Al | 180 |

The foregoing table demonstrates the decisive importance attached to the point of impingement of the electron beam and the remaining welding parameters. The extent to which this point of impingement must be displaced laterally to the joint into the material can be very easily found by a few preliminary studies in which the point of impingement is shifted into the material at a distance of some 0.05—0.3 mm. from the joint and the ductility of the welding joint is determined with the help of the maximum attainable bending angle.

With the aid of the method according to the invention flawless and ductile welding joints can even be achieved in the most difficult cases, so that hardness values in the melted-on zone do not in part exceed those of the two starting materials and bending angles up to 180° and more are possible.

In the following paragraphs the invention shall be explained in more detail with the aid of FIGS. 5 through 9 and taking as examples the material combinations V 10 Ti—Cr Ni 18 8. The thickness of sheet specimens was always 0.5 mm.

Figure 5:
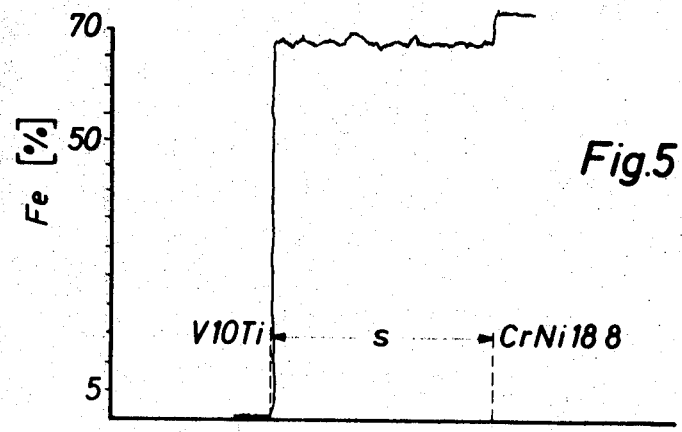

FIG. 5 shows the concentration development of iron over the welding seam width in case of a welding with optimum welding parameters.

Figure 6:
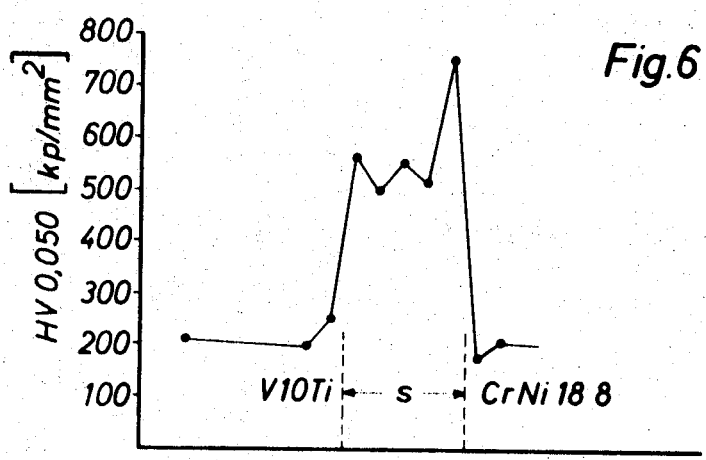
Figure 7:
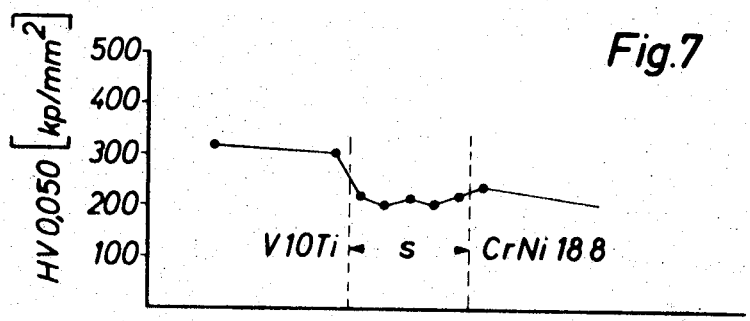
Figure 8:
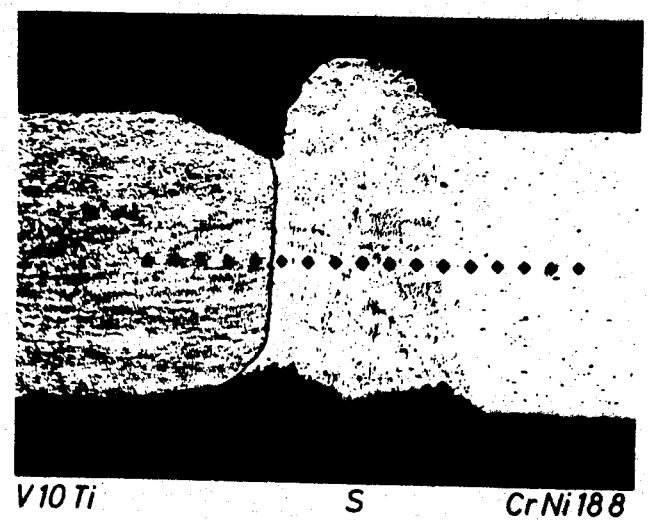

FIGS. 6 and 7 show the hardness development over the welding seam; in the first case the welding according to the invention was carried out without a lateral displacement of the electron beam, whilst in the second case it was carried out in the absence of any displacement FIG. 8 shows a metallographic micrograph of the welding specimen performed under the method according to the invention with optimum conditions of welding parameters.

Figure 9:
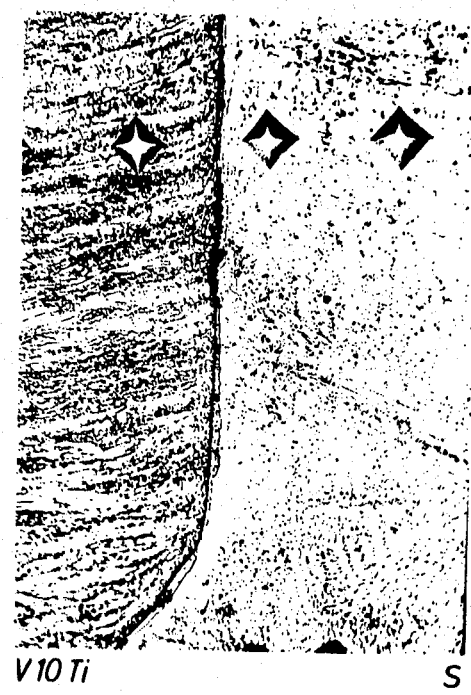

FIG. 9 shows in a detail enlargement from the micrograph of FIG. 8 the contraction of the intermetallic phases.

In FIG. 5 is plotted the iron concentration development for a Fe-concentration welded under the method according to the invention, V 10 Ti and Cr Ni 18 8 representing the zone of materials adjoining the welding joint, s the zone of the welding joint which has become molten during the welding or at least chemically transformed. This FIG. shows that the iron content which is nought in the material V 10 Ti—apart from impurities—jerkily increases in the boundary region of the welding seam s in a zone of only few $\mu$m width to reach a Fe-concentration of 70 percent; it also shows that this concentration of 70 percent remains subsequently constant over the whole about 0.27 mm. wide welding seam s and suddenly changes over to the Fe-concentration in Cr Ni 18 8 steel. Since for these material concentrations the intermetallic phases and/or brittle mixed crystals occur in Fe-concentration zones below 70 percent and this zone can be bridged by a concentration leap with the method according to the invention, or in other words, since these intermetallic phases and/or brittle mixed crystals can be contracted to a zone of few $\mu$m width, ductile and flawless welding joints can be achieved. The welding data for the performance of this welding joint are: U = 105 kV; I = 2.4 mA; v = 40 mm/s; $L_p$ = 1ms; $L_i$ = 0.4 ms; the point of impingement of the electron beam being displaced laterally by 0.15 mm. into the Cr Ni 18 8 material.

In FIG. 6 the development of microhardness along the welding seam is plotted for a welding in which the electron beam was focused to the joint between V 10 Ti and Cr Ni 18 8 contrary to the method according to the invention. On the ordinate are plotted the hardness values obtained with the Vickers method for a load of 0.050 kp/mm.$^s$ along the measuring section which is diagonal to the welding seam. Measurement is started with the V 10 Ti material where hardness values of about 200 kp/mm.$^2$ occur. In the zone s melted-on during the welding, the hardness values reach prohibitively high values of about 750 kp/mm.$^2$ due to the formation of mixed crystals, whilst they decrease to 200 kp/mm.$^2$ outside the welding seam s in the Cr Ni 18 8 zone. With the hardness values achieved in this case, the welding joint is so brittle that it breaks when it is charged with relative small loads.

As a comparison, FIG. 7 shows the development of microhardness plotted over the welding seam, as it is observed under the method according to the invention following the lateral displacement of the point of impingement of the electron beam by 0.15 mm. from the joint into the Cr Ni 18 8 material. Apart from lateral displacement, the same welding parameters, i.e., U = 105 kV; I = 2.4 mA; v = 40 mm/s; $L_p$ = 1 ms; $L_i$ = 0.4 ms. were used for both weldings. The course of the hardness curve shows that the hardness values in the welding seam s do not exceed the hardness values in the basic materials V 10 Ti and Cr Ni 18 8 steel. As a consequence, very ductile welding seams are obtained.

FIG. 8 shows a metallographic micrograph of a welding seam a hundred times enlarged which is produced under the method according to the invention. For the welding the same welding parameters were used as described in the FIGS. 5 and 7, i.e., U = 105 kV; I = 2.4 mA; v = 40 mm/s; $L_p$ = 1 ms; $L_i$ = 0.4 ms; lateral displacement of the point of impingement of the electron beam towards the joint by 0.15 mm. into the Cr Ni 18 8 material. The measuring points arranged in a horizontal line constitute the microhardness impressions with a load of 50 pond/mm$^2$ (= H$_{Vickers}$ 0.050 kp/mm$^2$) caused by the evaluation procedure. On the left-hand side of the picture of the V 10 Ti-material can be recognized which is separated from the zone of the welding melt S (center of the picture) by a series of vertical black lines representing the contracted intermetallic phase and being situated between the 5. and 6. measuring point on the left side. Next to the welding melt S lies the material Cr Ni 18 8 in which are situated the 6 right measuring points. The ductile welding joint is achieved by this enormous contraction of the intermetallic phase.

FIG. 9 represents a section showing the contracted intermetallic phases 250 times enlarged. It can be seen that the intermetallic phases are interrupted several times.

The material combinations entered in the table could not be satisfactorily welded with the aid of conventional methods. Due to extremely high hardness values they broke or produced cracks immediately after melding. Only in cases where the conditions of the method according to the invention are observed, welding seams could be obtained which are satisfactory in every respect.

We claim:

1. A welding method for the reduction of the brittle intermetallic phase normally produced in a welded seam between two dissimilar metals which phase adversely affects the stability of the welded joint, comprising applying a beam of charged particles to cause fusion in the area of the weld and controlling the application of the same, the welding parameters being controlled according to the following equation:

$$I \cdot \frac{L_p}{L_i} \cdot U \cdot v > 7 \cdot 10^2 \left( \frac{\text{Watt} \cdot \text{cm.}}{\text{sec}} \right)$$

wherein:
I = beam current in Amp.,
$L_p$ = period length in milliseconds,
$L_i$ = impulse length in milliseconds,
$\frac{L_p}{L_i}$ = keying ratio,
U = acceleration voltage in volt, and
v = welding velocity in cm/sec, and the position of the line of impingement of said beam being in the range of 0.07 to 0.2 mm. away from the center of the joint, such that there is a constant concentration of the metal components over a major portion of the width of the weld which is substantially different from the normal concentration thereof in said intermetallic phase, but intermediate of the concentrations thereof in each of said two dissimilar metals, whereby the zone of said intermetallic phase is relatively quite small and the concentration change of the metal components therein is quite precipitous.

2. In the welding of two dissimilar metals each of which in the area of welding has an initial thickness less than about 5 mm., said two dissimilar metals with respect to a single pure metal component having substantially different amounts of said metal component and said welding being effected by progressively heating and fusing of the joint along the line of weld by impingement thereon of an electron beam, the improvement resulting in a minimization of the zone of the phase change across which the concentration of said pure metallic component changes from the higher value as it exists in one of said two dissimilar metals to the lower value as it exists in the other, comprising:

impinging said electron beam along a line parallel to the center line of said weld and spaced in the range of 0.07 to 0.2 mm. therefrom, and controlling the energy introduced into said weld according to:

$$I \cdot \frac{L_p}{L_i} \cdot U \cdot v > 7 \cdot 10^2 \left( \frac{\text{Watt} \cdot \text{cm.}}{\text{sec}} \right)$$

wherein:
I = beam current in Amp.,
$L_p$ = period length in milliseconds,
$L_i$ = impulse length in milliseconds,
U = beam voltage in volts, and
v = welding velocity in cm/sec.; the completed weld having, with respect to said pure metal component, a substantially constant concentration thereof intermediate of the concentration thereof in each of said dissimilar metals, across substantially the entire width of the zone of fusion of the metal with said zone of phase change being at the edge thereof within which said substantially constant concentration changes precipitously to equal the concentration of said pure metal component in one of said two dissimilar metals, and said completed weld having a hardness value at any intermediate point in said zone of fusion that does not exceed the hardness values of either of said two dissimilar metals.

PO-1050
(5/69)

UNITED STATES PATENT OFFICE
CERTIFICATE OF CORRECTION

Patent No. __3,560,700__  Dated __Feb. 2, 1971__

Inventor(s) __Werner Andreas Reidelsturz, et al.__

It is certified that error appears in the above-identified patent and that said Letters Patent are hereby corrected as shown below:

Col. 2, line 7, change "$10^3$-4," to --$10^3$-$10^4$--.

Col. 3, line 2, change "one" to --zone--.

Col. 4, the table, under "sheet thickness 0,5 m the 19th entry, change "CrNi 18-8-V1oTi" to --CrNi 18-8-V10Ti--;

Col. 4, the table, under the heading "point of impingement," the 19th entry, change "0.15 in CrNi to --0.15 in CrNi 18 8--.

Col. 5, line 4, change "a Fe-concentration" to --a specimen--;

line 11, after "µm" insert --(micromet

Signed and sealed this 9th day of May 1972.

(SEAL)
Attest:

EDWARD M. FLETCHER, JR.
Attesting Officer

ROBERT GOTTSCHALK
Commissioner of Patents